W. V. TURNER.
DUPLEX AIR BRAKE SYSTEM.
APPLICATION FILED NOV. 3, 1906.
965,612.
Patented July 26, 1910.
2 SHEETS—SHEET 1.
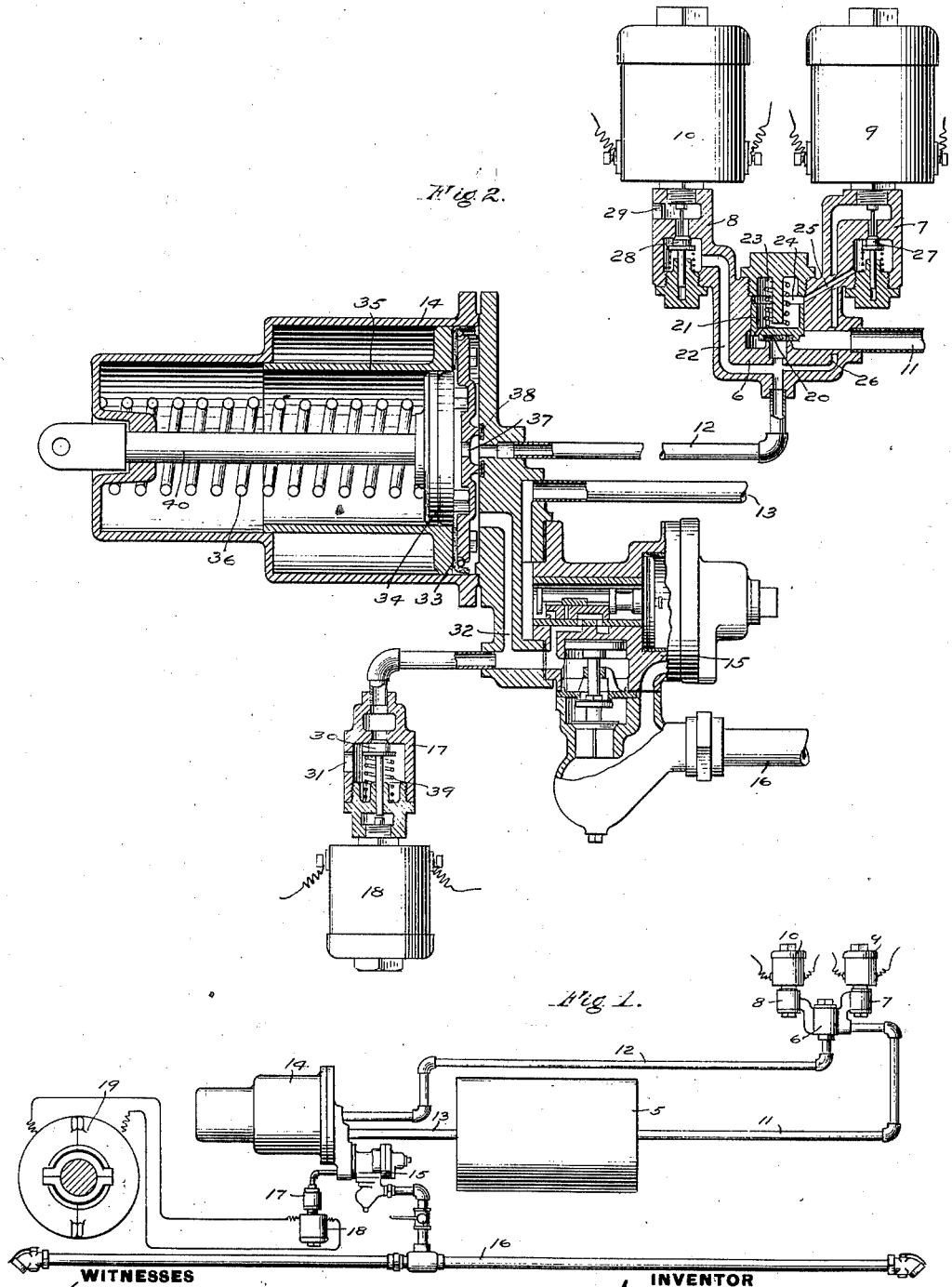
WITNESSES
J. S. Custer
J. B. MacDonald
INVENTOR
Walter V. Turner
by E. W. Wright
Att'y.

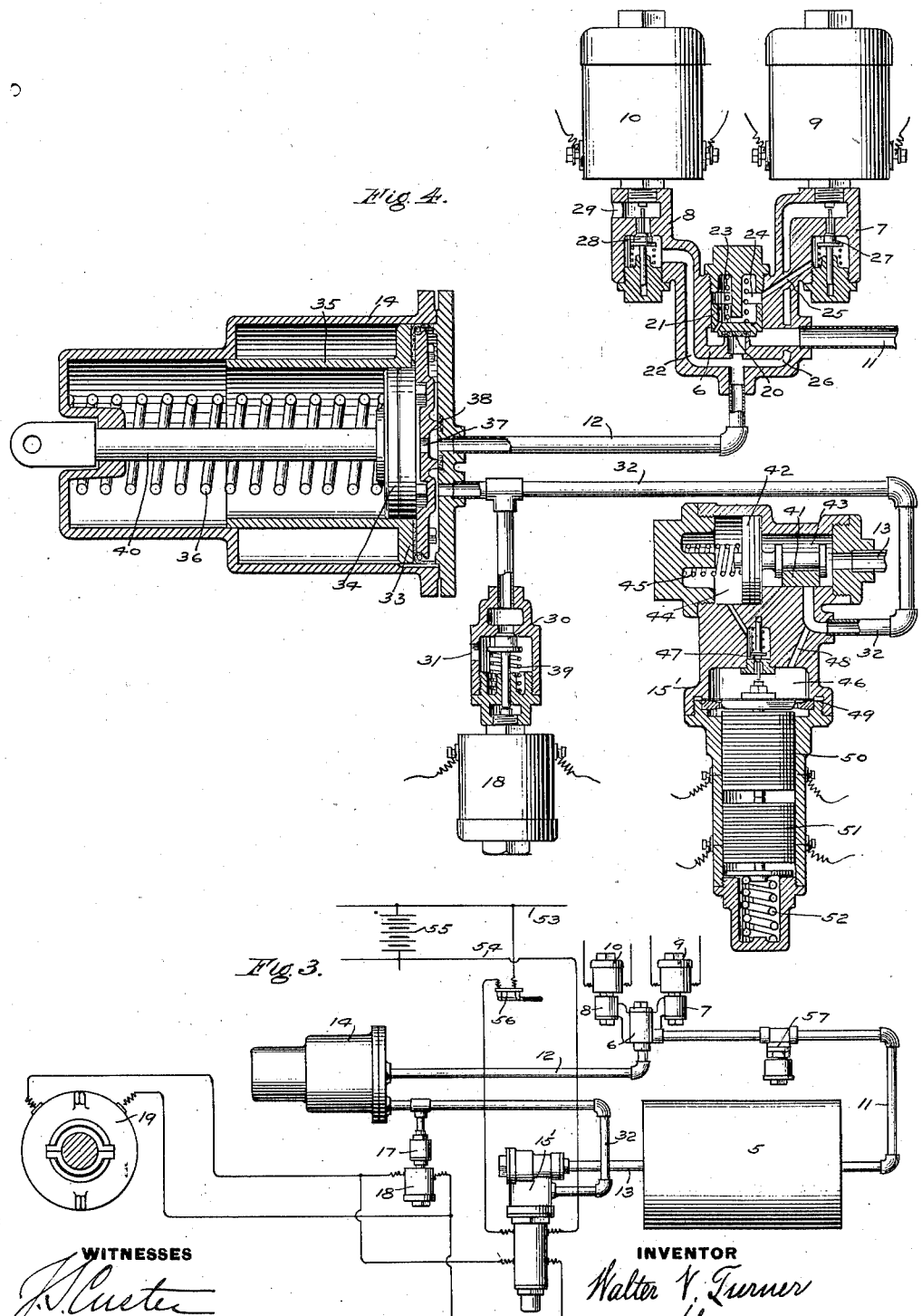

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

DUPLEX AIR-BRAKE SYSTEM.

965,612.      Specification of Letters Patent.     Patented July 26, 1910.

Application filed November 3, 1906. Serial No. 341,878.

*To all whom it may concern:*

Be it known that I, WALTER V. TURNER, a citizen of the United States, residing at Edgewood, in the county of Allegheny and State of Pennsylvania, have invented new and useful Improvements in Duplex Air-Brake Systems, of which the following is a specification.

This invention relates in general to fluid pressure brakes, and more particularly to that type of apparatus usually operated by compressed air, and adapted for use on electric cars or other vehicles.

The principal object of my present invention is to provide an improved double brake system, which may be operated in ordinary service applications by the direct supply and release of compressed air to and from the brake cylinder, while in case of emergencies or of the cars of the train pulling apart the brake may be automatically applied with greater pressure than in service applications.

One feature of my invention comprises two brake cylinders, or a double brake cylinder, with a manually controlled device for governing the direct supply and release of air to and from one of the brake cylinders, and an automatically operating mechanism for supplying air to the other, or to both of said brake cylinders in case of emergency.

Another feature of my invention comprises an improved form of electric application valve device for controlling the direct supply of air to the first or small brake cylinder.

Another feature of my invention comprises a speed controlled blow-down valve device for the second or large brake cylinder. And still another feature comprises an improved electrically operated valve device for controlling the supply of air to the second or large brake cylinder in emergency applications.

In the accompanying drawings; Figure 1 is a diagrammatic view in elevation illustrating a car brake equipment embodying one form of my improvements; Fig. 2 a view on a larger scale, the double brake cylinder and the valve devices being shown in section; Fig. 3 a diagram similar to Fig. 1, but illustrating an electrically controlled emergency valve device as a modification; and Fig. 4 a sectional view of the parts as embodied in the modified structure.

According to the construction shown in Figs. 1 and 2, the car brake equipment comprises a reservoir 5, which may be charged with air under pressure in any suitable manner. Two brake cylinders are provided, one small for ordinary service applications, and the other preferably larger for emergency applications, and while these brake cylinders may be connected up in any desired manner I prefer to employ that type of compound brake cylinder in which the small cylinder 35 is carried on the large piston 33 within the large cylinder 14 and contains the small piston 34 acting against the brake cylinder spring 36 and the rod 40. The large piston head 33 is provided with a circular rib or projection 38, which engages an annular gasket mounted in the large cylinder head and normally preserves a tight joint surrounding the port 37, which leads through the head into the small cylinder and registers with the inlet pipe connection 12 for supplying air in service applications.

Any suitable or preferred form of manually controlled device may be employed for governing the supply of air to and its release from the pipe 12 leading to the small or primary brake cylinder, but as herein shown, such device comprises an electric application valve device having a main valve casing 6, auxiliary valve casing 7 and electromagnet 9, and an electric release valve casing 8, with its electromagnet 10, the wires and circuits for all of said magnets on all the cars being extended through the train to a switch at the forward end of the head car or any other convenient location for operation by the motorman in charge, as will readily be understood.

A supply pipe 11 leads from the reservoir 5, or source of air pressure, to the electric application valve device, which comprises a main valve 20 operated by a piston 21 mounted in chamber 24 and controlling a port opening from supply pipe 11 to pipe 12 leading to the primary brake cylinder. The piston 21 is normally balanced as to fluid pressure by leakage of air around or through the piston to chamber 24, the valve being normally seated by a spring 23 and the additional area exposed to fluid pressure on the back of the piston. A port 25 leads from the piston chamber 24 to the regulating valve 27 which controls the release of air from said piston chamber to the outlet port 26, which may communicate with the brake cylinder pipe 12, or elsewhere. The electric release valve body 8 may, for convenience, be mounted on the main valve casing 6, and a port 22 leads from the brake cylinder pipe 12 to the release valve 28, which is operated by the magnet 10 to control the exhaust from the primary brake cylinder to the atmosphere through exhaust port 29.

When the system is duly charged with air under pressure and the application magnet 9 is energized in the usual way for making a service application of the brakes, the small auxiliary valve 27 is pushed from its seat, thereby releasing air from piston chamber 24, whereupon the greater pressure acting on the opposite side of piston 21 raises the valve 20 and opens the supply port to pipe 12 and the primary brake cylinder. When the switch is turned to break the circuit of the magnet 9 the valve 27 closes and the pressure quickly equalizes upon opposite sides of piston 21, whereupon the spring acts to move the valve 20 to its seat and close the supply port. By the use of a small auxiliary valve for governing the pressure on the piston actuating the main valve a smaller magnet may be employed to control the device while at the same time a large port may be quickly opened for supplying air to the brake cylinder in sufficient volume to charge the same with the desired rapidity. The brake cylinder pressure may be graded down, or released, by energizing the magnet 10 and operating the release valve 28 in the usual way, as will be readily understood.

In order to operate the brakes in emergencies, either automatically by the pulling apart of the cars in the train or manually by the motorman or conductor from any point in the train, an emergency valve device is provided for supplying air to two brake cylinders or to a single larger brake cylinder than is used in service applications for the purpose of giving a greater braking power in case of emergency. As shown in Figs. 1 and 2, this emergency valve device comprises a standard quick action triple valve 15 of the Westinghouse type, connected in the usual manner to the automatic train line pipe 16, which extends through the train, and through which the wave of reduction in air pressure necessary for operating the brakes in emergency may be made, either automatically by a break-in-two of the train, or by the opening of a brake valve or conductor's valve at any point in the train line. The valve chamber of the triple valve communicates by pipe 13 with the reservoir 5 and the brake cylinder port 32 leads to the large brake cylinder 14. In order to prevent an excessive braking pressure in the large cylinder, and to provide for controlling the pressure therein according to the speed of the vehicle, a blow-down valve device 17 may be connected to said brake cylinder and governed by an electro-magnet 18, the supply of current to which is furnished by an electric generator 19 driven by the axle or momentum of the vehicle. The valve 30 controls the blow-down of the brake cylinder pressure to the atmosphere through the outlet port 31 and is normally held to its seat by means of a spring 39 of the desired tension.

When the brakes are being operated in ordinary service by the direct manually controlled device, air is supplied through pipe 12 and port 37 to the small brake cylinder 35, forcing out the small piston 34 against the spring 36, but causing no movement of the large piston. When the brakes are operated in emergency, and air is supplied through port 32 to the large brake cylinder 14, the large piston 33 is forced out carrying with it the small cylinder and piston 34, thereby giving increased braking power. If the pressure in the large brake cylinder rises above the tension of the spring 39 of the blow-off valve, this will open and discharge the excess pressure to the atmosphere provided the speed of the vehicle is below a certain rate. If, however, the train is moving at high speed, the electric current supplied from the generator 19 to the magnet 18 operates to assist the spring to hold the valve 30 closed, thereby retaining a higher pressure in the brake cylinder. It will be seen that the force exerted by the magnet 18 toward holding the valve 30 closed varies according to the speed, so that a high pressure may be retained in the brake cylinder in emergency applications at high speed and correspondingly lower pressures as the speed diminishes. It will be obvious that any other form of high speed reducing valve device may be employed, if preferred.

As a modification of the emergency valve device for supplying air to the large brake cylinder, I have shown in Figs. 3 and 4 a mechanism, 15', comprising a main valve 41 in chamber 43, communicating by pipe 13 with the reservoir, and operated by piston 42 for controlling the port or pipe 32 leading to the emergency brake cylinder. A spring 45 normally holds the valve closed when the pressure equalizes in chamber 44, the outlet from which is governed by small regulating valve 47, operated by diaphragm 49 in chamber 46, which is subject to the emergency brake cylinder pressure through port 48. The regulating valve 47 is also operated by the solenoid or electromagnet 50, the coil of which is connected in circuit with wires 53 and 54 running through the car or through the train and constantly supplied with current from any convenient source, such as a storage battery 55. Another solenoid or electromagnet 51 also acts on the diaphragm stem and regulating valve 47, as does also the adjustable spring 52. The coil of magnet 51 is connected in circuit with the speed controlled generator 19, and consequently the force which this magnet exerts toward overcoming the spring 52 and holding the regulating valve closed varies according to the speed of the car. The strength or opposing force exerted by constantly energized magnet 50 is designed to normally balance the force of the spring 52, so that the regulating valve 47 and the emergency valve 41 normally remain closed during all service operations of the brakes by means of the directly controlled application valve mechanism.

Whenever the cars of the train are accidentally pulled apart, or, if for any other reason, the circuit 53—54 is broken, as by opening the conductor's emergency switch 56, the force exerted by magnet 50 ceases and the spring 52 operates instantly to open the regulating valve 47, thereby releasing pressure from chamber 44, whereupon the piston 42 moves the slide valve 41 to open the port 32 and supply air to the larger or emergency brake cylinder. When the pressure in the large brake cylinder, and consequently in diaphragm chamber 46 increases to a predetermined point for which the spring 52 is adjusted, the diaphragm will move down and allow the regulating valve to close, thereby preventing the admission of an excessive pressure to the emergency brake cylinder when the car is running at a low speed. If, however, the speed is high, the additional force or pull of the magnet 51 will be exerted on the diaphragm 49 to a greater or less extent, thereby permitting the valve 47 to remain open and admit a higher degree of pressure to the emergency brake cylinder. It will now be apparent that by this means the degree of pressure admitted to the large brake cylinder in emergency applications will be controlled according to the speed of the car, a greater pressure being applied at high speeds, while at or below a certain rate of speed the brake cylinder pressure will be limited to a predetermined lower degree. When a high degree of pressure has been admitted to the large brake cylinder by the valve 41 in emergency application it will be gradually blown down to the desired amount by means of discharge valve 30, as the speed diminishes, as before described.

The service operation of the brakes may be the same as previously described with reference to Figs. 1 and 2, and, if desired, a regulator or reducing valve 57 may be employed in the supply pipe 11 for limiting the maximum degree of pressure supplied to the service brake cylinder to a predetermined amount.

Having now described my invention, what I claim as new and desire to secure by Letters Patent, is:—

1. In a fluid pressure brake, the combination with a brake cylinder, and a manually controlled valve mechanism for supplying fluid directly to the brake cylinder in service applications, of an emergency valve device for supplying fluid to a larger brake cylinder capacity in emergency applications.

2. In a fluid pressure brake, the combination with a brake cylinder, and a manually controlled valve mechanism for supplying fluid directly to the brake cylinder in service applications, of a greater effective brake cylinder area for emergency applications, and an emergency valve device adapted to automatically supply fluid to the greater brake cylinder area.

3. In a fluid pressure brake, the combination with a brake cylinder, and a manually controlled valve mechanism for supplying fluid directly to the brake cylinder in service applications, of a larger brake cylinder, and an emergency valve device automatically operative to supply fluid to said larger brake cylinder in emergency applications.

4. In a fluid pressure brake, the combination with a brake cylinder, of an electric application valve device for controlling the supply of fluid directly to said brake cylinder in service applications, a greater effective brake cylinder area for emergency applications, and an emergency valve device adapted to automatically supply fluid to said greater brake cylinder area.

5. In a fluid pressure brake, the combination with a brake cylinder, and a manually controlled valve mechanism for supplying fluid to said brake cylinder in service applications, of a greater effective brake cylinder area for emergency applications, an emergency valve device adapted to automatically supply fluid to said greater brake cylinder area, and a speed controlled valve means for governing the pressure in the greater brake cylinder.

6. In a fluid pressure brake, the combination with a brake cylinder, of an electric application valve device comprising a main valve for controlling the supply of fluid directly to the brake cylinder, a piston for operating said valve, subject on one side to fluid under pressure and having means for permitting equalization of fluid pressures on opposite sides thereof, and a magnetically operated valve means for varying the pressure on one side of said piston.

7. In a fluid pressure brake, the combination with a brake cylinder, of an electric application valve device comprising a main valve for controlling the supply of fluid directly to the brake cylinder, a piston for operating said valve, subject on one side to fluid under pressure and having means for permitting equalization of fluid pressures on opposite sides thereof, an auxiliary valve for controlling the release of fluid under pressure from one side of said piston and an electro-magnet for operating said auxiliary valve.

8. An emergency valve device for fluid pressure brakes comprising a main valve for controlling the supply of fluid to a brake cylinder, a piston for operating said valve, an auxiliary valve for governing the pressure on said piston, a diaphragm subject to the brake cylinder pressure for operating said auxiliary valve, and an electromagnet also operating on said auxiliary valve.

9. An emergency valve device for fluid pressure brakes comprising a main valve for controlling the supply of fluid to a brake cylinder, a piston for operating said valve, an auxiliary valve for governing the pressure on said piston, a diaphragm subject to the brake cylinder pressure for operating said auxiliary valve, and a speed controlled device also acting on said auxiliary valve.

10. An emergency valve device for fluid pressure brakes, comprising a valve for controlling the supply of fluid to a brake cylinder, an electromagnet located in a normally energized circuit for controlling the operation of said valve, and another electromagnet, the current to which is regulated according to the speed of the car, for also governing the operation of said valve.

11. In a fluid pressure brake, the combination with a service brake cylinder, a reservoir or source of fluid under pressure, and a manually controlled valve mechanism for supplying fluid from said reservoir to said brake cylinder, of an emergency brake cylinder, and an automatic valve device for supplying fluid from said reservoir to the emergency brake cylinder in emergency applications.

12. In a fluid pressure brake, the combination with a brake cylinder, and a source of fluid pressure, of an electric application valve device, comprising a main valve controlling communication from said source of supply to the brake cylinder, a piston subject on one side to the pressure from said source of supply for operating the main valve, and a magnetically operated valve for controlling the release of pressure from the chamber on the opposite side of said piston.

13. In a fluid pressure brake, the combination with a brake cylinder, and a source of fluid pressure, of an electric application valve device comprising a main valve, controlling communication from said source of supply to the brake cylinder, a piston subject on one side to the pressure from said source of supply for operating the main valve, means for permitting a restricted flow of pressure from said source to the chamber on the opposite side of the piston, an auxiliary valve for controlling the release of pressure from said chamber, and an electromagnet for operating said auxiliary valve.

14. In a fluid pressure brake, the combination with a brake cylinder, and a manually controlled valve mechanism for supplying fluid directly to the brake cylinder in service applications, of an emergency valve device for supplying fluid to the brake cylinder in emergency applications, and means for varying the brake cylinder capacity in emergency applications, to augment the braking power.

In testimony whereof I have hereunto set my hand.

WALTER V. TURNER.

Witnesses:
R. F. EMERY,
J. B. MACDONALD.